United States Patent Office 3,136,155
Patented June 9, 1964

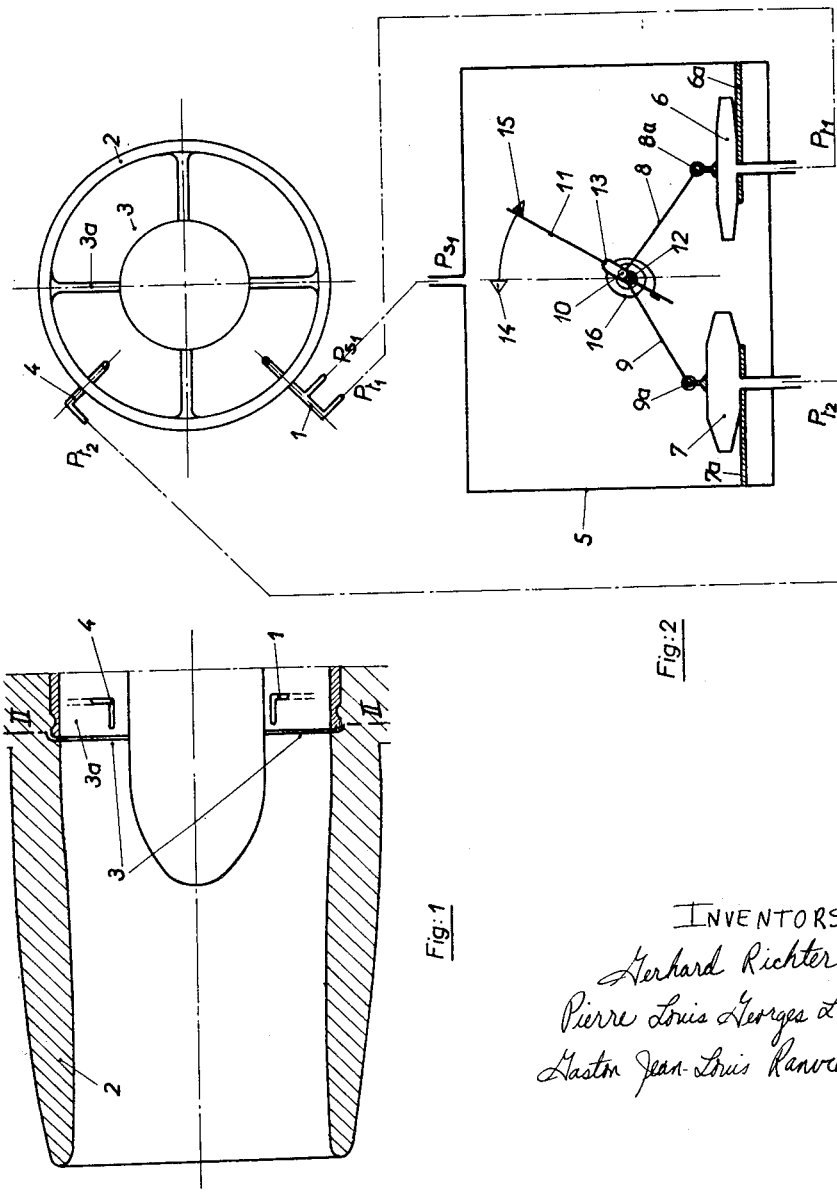

3,136,155
METHOD AND APPARATUS FOR INDICATING THE TRANSVERSE DISTRIBUTION OF AIR IN A TURBOJET ENGINE OF A VTOL AIRCRAFT
Gerhard Richter, Dammarie-les-Lys, Seine-et-Marne, Pierre Louis Georges Lhoste, Yerres, Seine-et-Oise, and Gaston Jean-Louis Ranvier, Issy-les-Moulineaux, Seine, France, assignors to Societe Nationale d'Etude et de Construction de Moteurs d'Aviation, Paris, France, a company of France
Filed Jan. 9, 1961, Ser. No. 81,484
Claims priority, application France Jan. 20, 1960
6 Claims. (Cl. 73—116)

Aircraft capable of taking off and landing vertically have to operate with high incidences which may range betwen 20° and 110° approximately, chiefly during the flattening-out phase before the descent preceding landing, that is to say during the change-over from horizontal flight to vertical flight.

During this phase of flight, the turbo-jet engine of the machine is supplied with air whose speed distribution at the intake of the compressor becomes less and less uniform as the angle of incidence increase. In this case, there is a risk that flame-out of the engine will occur, and it is necessary to have a signal warning the pilot of the aircraft at a sufficiently early stage for him to be able to correct his maneuver or modify the working state of the engine.

The method according to the invention makes it possible to give this indication to the pilot once the "incidence-speed" range in which the jet engine can operate correctly has been determined in a wind tunnel.

According to the present invention, the total pressures are detected at two pre-determined points on the air intake duct, which are situated on either side of the horizontal plane containing the axis of the turbo-jet engine (during horizontal flight of the machine) and the static pressure at one of these points, the values of the pressures detected are combined so as to form a ratio equal, except for a constant, to the quotient constituted by the differences in the total pressures over the dynamic pressure at the point at which both the total pressure and the static pressure are detected, the value of this ratio giving the pilot an indication which can be compared with a critical indication deduced from preliminary tests and at which there is a risk that flame-out of the engine will occur.

According to an advantageous embodiment of the invention, the total pressures are detected by two total-pressure probes each connected to a deformable capsule, these two capsules being situated within a closed casing in which the static reference pressure prevails, and mechanical means being associated with these capsules to pivot a needle providing a visible indication for the pilot. Preferably, means are provided for holding the needle in a position which said mechanical means are insufficient to determine, such as the symmetrical position of the capsules corresponding to the jet engine being in the stopped condition.

The invention is illustrated by way of example in the accompanying drawings, in which:

FIGURE 1 is a partial sectional view of the air intake duct of a turbo-jet engine, equipped with total-pressure probes;

FIGURE 2 is a sectional view taken along the line II—II of FIGURE 1, the total-pressure probes being connected to an indicating device;

Figure 3:
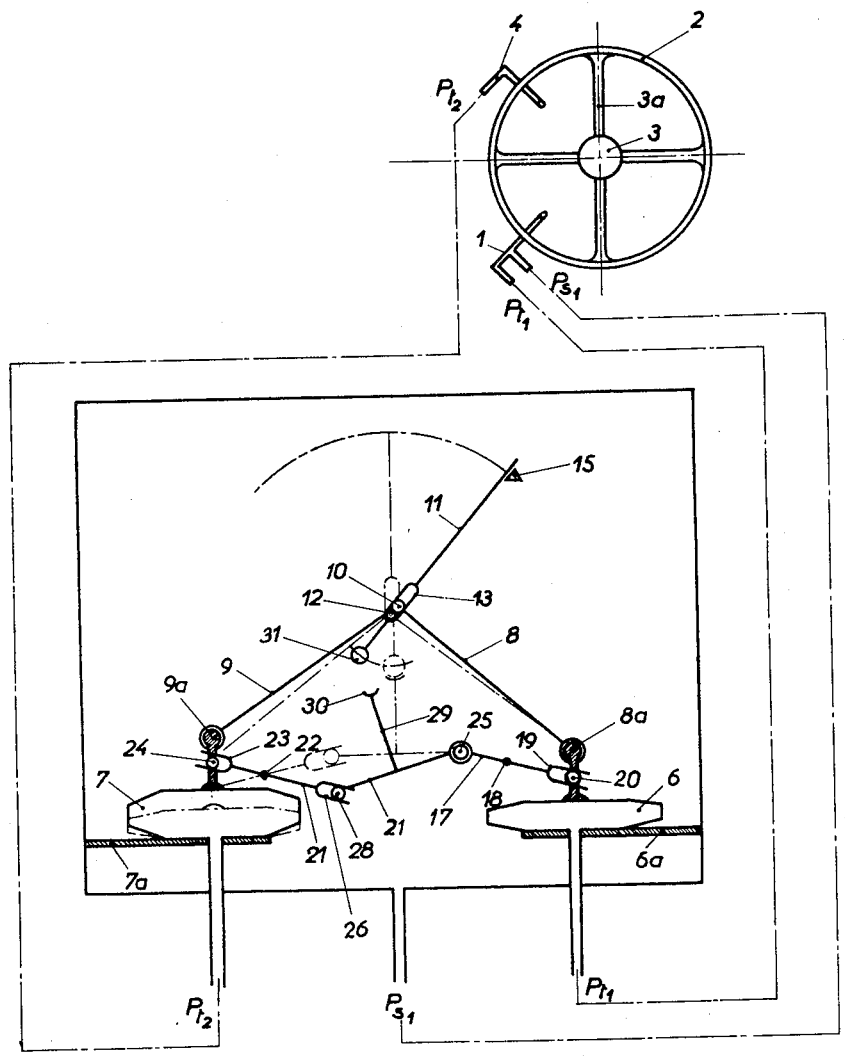
FIGURE 3 is a modified form of embodiment of the apparatus shown in FIGURE 2.

The apparatus according to the present invention is based on the following considerations: If the total pressure loss at the intake of a compressor is measured by means of two, for example, comb-shaped probes arranged on two radii situated on each side of the horizontal plane containing the axis of the turbo-jet engine whilst the machine equipped with this turbo-jet engine is in horizontal flight, there are observed, when the angle of incidence increases:

On the upper radius, a fairly wide zone over which the pressure loss is slight or nil and in any case is very little influenced by the incidence;

On the lower radius, much greater pressure losses which increase proportionally with the incidence.

In these circumstances, it is easy simply with the aid of two total-pressure probes suitably positioned, to detect a pressure difference $\Delta P_t$ by a capsule.

Having, previously, determined by wind tunnel tests the values of $\Delta P_t/Q$ (Q being the dynamic pressure at a reference point) at which the break down of the engine takes place, it is possible to fix a certain safety margin and to connect the capsule or other detecting system either to a visual signal or to an acoustic signal warning the pilot as soon as the lower limit of this safety margin is reached.

In the form of embodiment of FIGURES 1 and 2, a probe 1 giving the total pressure $P_{t1}$ is arranged at the lower portion of the air intake duct 2 just upstream of the intake of the compressor 3 between the radial arms 3a supporting the latter, at a given point on the radius. This probe is arranged to supply the static pressure $P_{s1}$ also. Probes of known type, for example a Prandtl probe, can be used for this purpose.

At the upper portion of the air intake duct 2, a probe 4 gives the total pressure $P_{t2}$ at a given point on the radius. This probe can be, for example, a Pitot tube, that is to say a bent tube whose intake is directed oppositely to the speed of flow of the incident air.

The static pressure tap from the probe 1 is connected directly to the casing 5 of an indicating device, so that the internal volume of this casing is subjected to the pressure $P_{s1}$. The total pressure tap of the probe 1 communicates with the interior of a deformable capsule 6, whilst the total pressure probe 4 communicates with another deformable capsule 7. The two capsules are enclosed in the casing 5 and are fixed along one of their faces on a support 6a, 7a of the casing. The other faces of the capsules 6 and 7 are, therefore, subjected respectively to the pressure differences $P_{t1}-P_{s1}$ and $P_{t2}-P_{s1}$.

Two rods 8 and 9 of the same length are pivotably connected at 8a and 9a to each of the free faces of the capsules 5 and 6 respectively. These rods are also pivotably connected together at 10. A needle 11 pivotable about a pin 12 comprises a slot or slideway 13 in which the pivot 10 is slidable. The angular deflection of the needle 11 takes place between a stop 14 and an alarm point 15.

At the rest position, for values of $P_{t2}-P_{s1}$ and $P_{t1}-P_{s1}$ equal to nil, the pivot 10 coincides with the pin 12 on which the needle 11 rotates, but for any variation of these values it corresponds to the sliding of the pivot 10 in the slideway 13. This transmission makes it possible to bring about, for each value of the quotient $$\frac{P_{t2}-P_{s1}}{P_{t1}-P_{s1}}$$

an angular displacement of the needle 11. Since the slideway 13 cannot exert a directive function when the pivot 10 coincides with the pin 12, the needle 11 is held in the rest position by means of a very light spiral spring 16 which returns the needle against the stop 14.

This arrangement for holding the needle in the rest position is valid in the case where $$\frac{P_{t2}-P_{s1}}{P_{t1}-P_{s1}}$$

is greater than 1. If this quotient is capable of varying at values greater than or less than 1, the arrangement shown in FIGURE 3 can be used.

As previously, the pivot 10, common to two rods 8 and 9 pivotally connected to the capsules 6 and 7, is slidable in a slot 13 of a needle 11 pivoting about a pin 12.

A lever 17 pivotable about a pin 18 also carries at one end a slideway 19 pivotably movable on a point 20 between the pivot 8a and the free face of the capsule 6.

Likewise, a lever 21 pivoting about a pin 22 carries at one end a slideway 23 pivoting about a point 24 between the pivot 9a and the free face of the capsule 7.

The other end of the lever 17 comprises a pivot 25, whilst the other end of the lever 21 carries a slideway 26. A rocker 27 pivotably mounted at 25 carries a point 28 which slides in the slideway 26 and a perpendicular arm 29 at the end of which there is fixed a cup 30 which fits very easily against the outline of a sphere 31 carried by the needle 11.

In the only case when the position of the needle 11 would be undetermined by the mere cooperation of the two rods 8, 9 and more precisely of their connecting pivot 10, with the slideway 13, and the pin 12, both the total pressures being then equal to the static pressure, i.e., when the jet engine is stopped, the cup 30 holds the needle 11 by means of the sphere 31 as indicated in chain-dotted lines in the drawings. As soon as the jet engine is ignited, the dynamic pressures (each equal to the total pressure of the point considered less the static pressure) actuate the capsules 6 and 7 and the rocker 27 releases the sphere 31.

As previously, this transmission makes it possible to provide an angular displacement of the needle for each value of the quotient:

$$\frac{P_{t2}-P_{s1}}{P_{t1}-P_{s1}} = \frac{P_{t2}-P_{t1}}{P_{t1}-P_{s1}} + 1 = \frac{\Delta P_t}{Q} + 1$$

Thus, to a certain quotient $$\frac{\Delta P_t}{Q}$$

in which $\Delta P_t$ is the difference between the total pressures at the upper and lower points and Q the dynamic pressure at a given point, defined in tests as being criitcal for the behaviour of the jet engine, there corresponds a value of the same magnitude $$\frac{P_{t2}-P_{s1}}{P_{t1}P_{s1}} - 1$$

detected by the apparatus and defined thereon by the alarm point 15.

The apparatus according to the invention is independent of the type of air intake. Thus, the air intake duct can be a single duct at the front of the fuselage; there may also be two semi-ducts one on either side of the fuselage, or any other arrangement.

Similarly, the respective positions of the probes are to be determined experimentally in accordance with the type of intake flow.

What we claim is:

1. A method of indicating the transverse distribution of air in a turbo-jet engine provided with an air intake duct in an aircraft adapted to take off and land vertically, consisting in detecting the total pressures at two specific points in the air intake duct which are situated on either side of the horizontal plane containing the axis of the said turbo-jet engine during the horizontal flight of the aircraft and the static pressure at one of the said points, in combining the detected values of the said total pressures and the said static pressure to form a ratio equal, except for a constant, to the quotient constituted by the differences between the said total pressures over the dynamic pressure at the point where the said total pressure and the said static pressure are detected, and in comparing the indication given by the value of the said ratio with a critical indication deduced from previous tests, at which there is a risk that flame-out of the engine may occur.

2. Apparatus for indicating the transverse distribution of air in a turbo-jet engine provided with an air intake duct in an aircraft adapted to take off and land vertically, comprising a first probe detecting the total pressure and a second probe comprising a first tap for detecting the total pressure and a second tap for detecting the static pressure of the current of air admitted into the said air intake duct, the two said probes being arranged on either side of the horizontal plane containing the axis of the said turbo-jet engine when the aircraft is in the horizontal position, two capsules comprising a deformable wall whose interiors are each connected to one of the said total pressure taps, a sealing-tight casing whose interior is connected to the said static pressure tap and in which the said deformable capsules are locally fixed so that the said deformable wall of each capsule is subjected externally of the said capsule to the static pressure, mechanical means comprising a needle being associated with the said deformable walls of the said capsules for displacing the said needle as a function of the ratio equal to the quotient of the differences between the said total pressures by the difference between the total pressure and the static pressure detected by the said second probe, and a dial bearing a critical indication deduced from preliminary tests, the said needle being adapted to be displaced relatively to the said dial.

3. Apparatus according to claim 2, comprising means for determining the needle position when the said turbojet engine is stopped.

4. Apparatus according to claim 2, wherein the mechanical means comprise rods of equal length pivotably connected on the one hand to one another at a common pivot and on the other hand to each of the said capsules, which have parallel axes, and the said needle, pivoted about a fixed point equidistant from said axes and comprising a slideway in which said common pivot is displaceable.

5. Apparatus according to claim 3, wherein the means for determining the needle position when the turbojet engine is stopped comprise a stop and a light spiral spring urging said needle against said stop.

6. Apparatus for indicating the transverse distribution of air in a turbo-jet engine provided with an air intake duct in an aircraft adapted to take off and land vertically, comprising a first probe detecting the total pressure and a second probe comprising a first tap for detecting the total pressure and a second tap for detecting the static pressure of the current of air admitted into the said air intake duct, the two said probes being arranged on either side of the horizontal plane containing the axis of the said turbo-jet engine when the aircraft is in the horizontal position, two capsules comprising a deformable wall whose interiors are each connected to one of the said total pressure taps, a sealing-tight casing whose interior is connected to the said static pressure tap and in which the said deformable capsules are locally fixed so that the said deformable wall of each capsule is subjected externally of the said capsule to the static pressure, mechanical means comprising a needle being associated with the said deformable walls of the said capsules for displacing the said needle as a function of the ratio equal to the quotient of the differences between the said total pressures by the difference between the total pressure and the static pressure detected by the said second probe, a dial bearing a critical indication deduced from preliminary tests, the said needle being adapted to be displaced relatively to the said dial, and means for determining the needle position when the said turbojet engine is stopped, said last-mentioned means comprising, in combination, a spherical ball carried by one end of said needle opposite to its hand; two levers each pivoted on a fixed point to said sealing-tight casing and pivotally connected to the said capsules at one of their ends, respectively; a rocker pivotally connected to the other end of each of said levers and carrying a cup matching the shape of said ball; and a slide means disposed at least at one end of said two levers and rocker, whereby the stop of said turbojet engine brings said capsules, levers and rocker into a position in which said cup retains said ball.

References Cited in the file of this patent

UNITED STATES PATENTS

| | | |
|---|---|---|
| 1,007,178 | Billings | Oct. 31, 1911 |
| 2,409,836 | Coe | Oct. 22, 1946 |
| 2,455,292 | Borden | Nov. 30, 1948 |
| 2,608,051 | Nettel | Aug. 26, 1952 |
| 2,693,081 | Russ | Nov. 2, 1954 |
| 2,870,684 | Johnson | Jan. 27, 1959 |
| 3,046,729 | Petren | July 31, 1962 |
| 3,078,658 | Sargent | Feb. 26, 1963 |